(12) United States Patent
Hara et al.

(10) Patent No.: US 10,747,637 B2
(45) Date of Patent: Aug. 18, 2020

(54) DETECTING ANOMALOUS SENSORS

(71) Applicant: INTERNATIONAL BUSINESS MACHINES CORPORATION, Armonk, NY (US)

(72) Inventors: Satoshi Hara, Tokyo (JP); Takayuki Katsuki, Tokyo (JP)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 36 days.

(21) Appl. No.: 15/842,233

(22) Filed: Dec. 14, 2017

(65) Prior Publication Data

US 2018/0107574 A1 Apr. 19, 2018

Related U.S. Application Data

(63) Continuation of application No. 14/984,915, filed on Dec. 30, 2015, now Pat. No. 9,892,012.

(51) Int. Cl.
  *G06F 11/30* (2006.01)
  *G06F 11/34* (2006.01)
  *G05B 23/02* (2006.01)
  *G06F 11/07* (2006.01)

(52) U.S. Cl.
  CPC ...... *G06F 11/3089* (2013.01); *G05B 23/0232* (2013.01); *G06F 11/0751* (2013.01); *G06F 11/3419* (2013.01); *G06F 11/3485* (2013.01); *G06F 11/3058* (2013.01)

(58) Field of Classification Search
  CPC .......................... G06F 11/3058; G06F 11/3089

USPC .................................................... 714/26, 47.3
See application file for complete search history.

(56) References Cited

U.S. PATENT DOCUMENTS

| | | | |
|---|---|---|---|
| 6,415,276 B1* | 7/2002 | Heger | G05B 9/02 702/183 |
| 7,225,343 B1* | 5/2007 | Honig | G06F 21/554 713/194 |
| 9,418,617 B1* | 8/2016 | Starner | G02B 27/017 |

(Continued)

OTHER PUBLICATIONS

Zhang, Y., Meratnia, N., and Havinga, "Outlier detection techniques for wireless sensor networks: A survey", IEEE Communications Surveys and Tutorials, vol. 12, No. 2, 2010, pp. 159-170. (Year: 2010).*

(Continued)

*Primary Examiner* — Chae M Ko
(74) *Attorney, Agent, or Firm* — Tutunjian & Bitetto, P.C.; Vazken Alexanian (57) ABSTRACT

Anomalous sensors are detected using an apparatus including a processor and one or more computer readable mediums collectively including instructions that, when executed by the processor, cause the processor to: obtain a plurality of healthy sensor data, wherein each of the healthy sensor data includes a plurality of sensed values of a corresponding sensor among a plurality of sensors in normal operation, generate a healthy data distribution of at least two sensors among the plurality of sensors based on the plurality of healthy sensor data, and generate a function of a status probability distribution of the plurality of sensors with respect to time under the condition of sensor data with respect to time based on the healthy data distribution.

25 Claims, 8 Drawing Sheets

(56) References Cited

U.S. PATENT DOCUMENTS

| | | | |
|---|---|---|---|
| 2005/0125154 A1* | 6/2005 | Kawasaki | G01D 1/16 |
| | | | 701/301 |
| 2005/0251364 A1* | 11/2005 | Kang | G05B 9/02 |
| | | | 702/183 |
| 2013/0031633 A1* | 1/2013 | Honig | G06F 21/554 |
| | | | 726/23 |
| 2013/0191681 A1* | 7/2013 | Moiseev | G05B 9/03 |
| | | | 714/2 |
| 2014/0278189 A1* | 9/2014 | Vanslyke | G16H 40/40 |
| | | | 702/104 |
| 2014/0358833 A1 | 12/2014 | Biem | |
| 2015/0006972 A1* | 1/2015 | Jones | G06F 11/076 |
| | | | 714/47.2 |
| 2015/0161394 A1* | 6/2015 | Ferragut | G06F 21/577 |
| | | | 726/25 |
| 2015/0234694 A1* | 8/2015 | Chow | G06F 11/0751 |
| | | | 714/47.3 |
| 2015/0317284 A1* | 11/2015 | Takahashi | G06F 17/18 |
| | | | 702/181 |
| 2015/0381646 A1* | 12/2015 | Lin | H04L 63/1416 |
| | | | 726/23 |
| 2016/0104329 A1* | 4/2016 | Sundareswara | G01M 17/00 |
| | | | 701/33.9 |
| 2016/0155068 A1* | 6/2016 | Hachiya | G06N 5/022 |
| | | | 706/12 |
| 2017/0067763 A1* | 3/2017 | Kodeswaran | G01D 18/00 |

OTHER PUBLICATIONS

List of IBM Patents or Patent Applications Treated as Related dated Dec. 14, 2017, 2 pages.

Rabatel, J. et al., "Anomaly detection in monitoring sensor data for preventive maintenance" Expert Systems with Applications, vol. 38, No. 6, Jun. 2011. (pp. 7003-7015).

Zhou, X. et al., "A Novel System Anomaly Prediction System Based on Belief Markov Model and Ensemble Classification" Mathematical Problems in Engineering, vol. 2013, Jul. 2013. (pp. 1-10).

* cited by examiner

| d=6 Sensors | Sensed value | status $\theta_i$ |
|---|---|---|
| Sensor 1 | $x_1$ | 1 (healthy) |
| Sensor 2 | $x_2$ | 1 (healthy) |
| Sensor 3 | $x_3$ | 1 (healthy) |
| Sensor 4 | $x_4$ | 1 (healthy) |
| Sensor 5 | $x_5$ | 0 (anomalous) |
| Sensor 6 | $x_6$ | 1 (healthy) |

|  | $\sigma^A$ | $\sigma^B$ |
|---|---|---|
| $\sigma_1$ | 1 | 1 |
| $\sigma_2$ | 2 | 4 |
| $\sigma_3$ | 3 | 2 |
| $\sigma_4$ | 4 | 5 |
| $\sigma_5$ | 5 | 3 |
| $\sigma_6$ | 6 | 6 |

DETECTING ANOMALOUS SENSORS

BACKGROUND

Technical Field

The present invention relates to detecting anomalous sensors.

Related Art

Detection of anomalous sensors is important in a variety of technical fields. It is often costly or almost impossible to monitor a great number of sensors with human eyes. Existing anomaly localization methods, such as the method disclosed in "T. Id'e, S. Papadimitriou, and M. Vlachos; COMPUTING CORRELATION ANOMALY SCORES USING STOCHASTIC NEAREST NEIGHBORS; Proceedings of the 7th IEEE International Conference on Data Mining, pages 523-528, 2007" determine a degree of anomaly of sensors. However, existing methods are computationally expensive, requiring lots of time, resources, or both, and do not indicate a degree of anomaly in an absolute sense, nor consider temporal information of sensor data.

SUMMARY

Therefore, it is a first aspect of the innovations herein to provide an apparatus including a processor and one or more computer readable mediums collectively including instructions that, when executed by the processor, cause the processor to: obtain a plurality of healthy sensor data, wherein each of the healthy sensor data includes a plurality of sensed values of a corresponding sensor among a plurality of sensors in normal operation, generate a healthy data distribution of at least two sensors among the plurality of sensors based on the plurality of healthy sensor data, and generate a function of a status probability distribution of the plurality of sensors with respect to time under the condition of sensor data with respect to time based on the healthy data distribution. According to the first aspect of the innovations, the apparatus may enable automated detection of anomalous sensors in an absolute manner and may utilize temporal information of sensor data.

In addition, it is a second aspect of the innovations herein to provide the apparatus of the first aspect, wherein the function of the status probability distribution is based on the data distributions with respect to time under the condition of status of the plurality of sensors. According to the second aspect, the apparatus may generate the function of the status probability distribution based on a temporal data distribution of the sensor data.

In addition, it is a third aspect of the innovations herein to provide the apparatus of the second aspect, wherein the instructions further cause the processor to estimate the status probability distribution from new sensor data. According to the third aspect, the apparatus may estimate a probability of anomaly of the new sensor data.

In addition, it is a fourth aspect of the innovations herein to provide the apparatus of the third aspect, wherein the function of the status probability distribution is based on a product of the data distributions with respect to time under the condition of status of the plurality of sensors. According to the fourth aspect, the apparatus may enable automated detection of anomalous sensors in an absolute manner, and may utilize temporal information of sensor data.

In addition, it is a fifth aspect of the innovations herein to provide the apparatus of the fourth aspect, wherein the function of the status probability distribution is further based on Beta prior distributions, wherein each Beta prior distribution represents a prior distribution of status of each sensor. According to the fifth aspect, the apparatus may enable automated detection of anomalous sensors in an absolute manner, and may utilize temporal information of sensor data.

In addition, it is a sixth aspect of the innovations herein to provide the apparatus of the fifth aspect, wherein the instructions further cause the processor to approximate the function of the status probability distribution with a Bernoulli distribution with respect to time. According to the sixth aspect, the apparatus may enable automated detection of anomalous sensors with even less computational resources, and further reduced time to detect anomalous sensors.

In addition, it is a seventh aspect of the innovations herein to provide the apparatus of the sixth aspect, wherein the approximation of the function of the status probability distribution includes updating parameters of the Beta prior distributions and the Bernoulli distribution with respect to time to reduce a difference caused by an approximation. According to the seventh aspect, the apparatus may enable automated detection of anomalous sensors with even less computational resources, and further reduced time to detect anomalous sensors.

In addition, it is an eighth aspect of the innovations herein to provide the apparatus of the third aspect, wherein the function of the status probability distribution is based on the data distributions with respect to time under the condition of status of the plurality of sensors having newer data distributions weighted more than older data distributions. According to the eighth aspect, the apparatus may enable automated detection of anomalous sensors based on newer data.

In addition, it is a ninth aspect of the innovations herein to provide the apparatus of the third aspect, wherein the function of the status probability distribution is based on the data distributions with respect to a first period of time under the condition of status of the plurality of sensors. According to the ninth aspect, the apparatus may enable automated detection of anomalous sensors based on sensor data of recent predetermined duration.

In addition, it is a tenth aspect of the innovations herein to provide the apparatus of the ninth aspect, wherein the instructions further cause the processor to estimate the function of the status probability distribution by approximating a parameter of a Bernoulli distribution for the new sensor data with respect to a second period of time and using a parameter of a Bernoulli distribution for previous data with respect to a third period of time, the third period of time being previous to the second period of time. According to the tenth aspect, the apparatus may enable automated detection of anomalous sensors with even less computational resources, based on the sensor data of recent predetermined duration, and further reduced time to detect anomalous sensors.

In addition, it is an eleventh aspect of the innovations herein to provide the apparatus of the tenth aspect, wherein the instructions further cause the processor to estimate the status probability distribution from the new sensor data by using a coordinate descent method. According to the eleventh aspect, the apparatus may enable automated detection of anomalous sensors with even less computational resources, and further reduced time to detect anomalous sensors.

In addition, it is a twelfth aspect of the innovations herein to provide the apparatus of the third aspect, wherein the instructions further cause the processor to determine whether each of the plurality of sensors is healthy or anomalous from the new sensor data based on the status probability distribution of the new sensor data. According to the twelfth aspect, the apparatus may enable automated detection of anomalous sensors in an absolute manner, and may utilize temporal information of sensor data.

In addition, it is a thirteenth aspect of the innovations herein to provide the apparatus of the first aspect, wherein the instructions further cause the processor to generate the function of the status probability distribution further based on an anomalous data distribution, wherein the anomalous data distribution is approximated with a uniform distribution. According to the thirteenth aspect, the apparatus may enable automated detection of anomalous sensors in an absolute manner.

In addition, it is a fourteenth aspect of the innovations herein to provide the apparatus of the first aspect, wherein the instructions further cause the processor to generate the healthy data distribution of a pair of sensors among the plurality of sensors. According to the fourteenth aspect, the apparatus may enable automated detection of anomalous sensors in an absolute manner.

These aspects of the innovations may also include a computer-implemented method performed by the apparatus, and a computer program product comprising a computer readable storage medium having program instructions embodied therewith, the program instructions executable to perform the method.

The summary clause does not necessarily describe all necessary features of the embodiments of the present invention. The present invention may also be a sub-combination of the features described above. The above and other features and advantages of the present invention will become more apparent from the following description of the embodiments taken in conjunction with the accompanying drawings.

DETAILED DESCRIPTION

Hereinafter, embodiments of the present invention will be described. The embodiments do not limit the invention according to the claims, and not all the combinations of the features described in the embodiments are necessarily essential to means provided by aspects of the invention.

Figure 1:
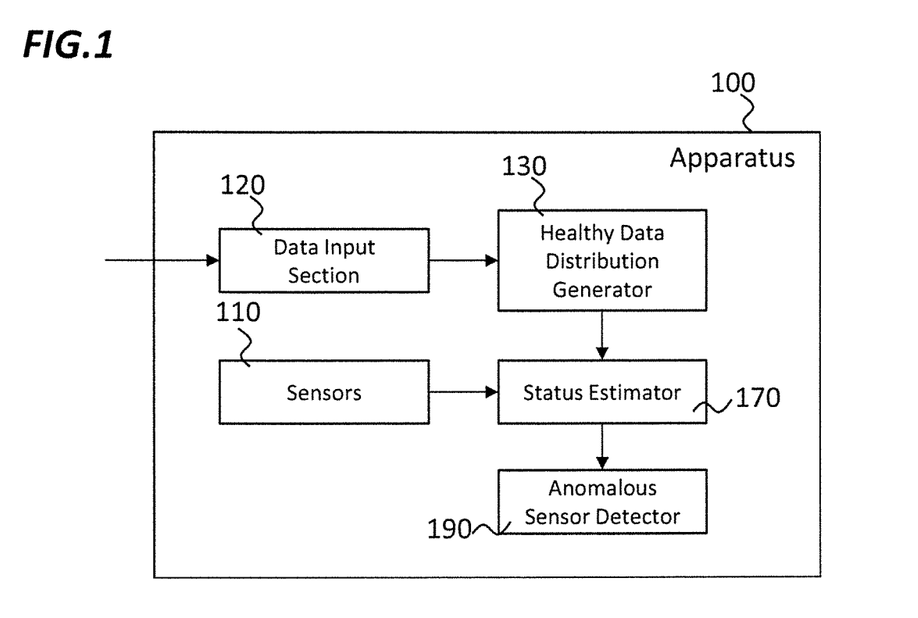
FIG. 1 shows an exemplary configuration of an apparatus 100, according to an embodiment of the present invention.

FIG. 1 shows an exemplary configuration of an apparatus 100, according to an embodiment of the present invention. The apparatus 100 may detect an anomalous sensor from a plurality of sensors based on a density model.

The apparatus 100 may comprise a processor, one or more computer readable mediums collectively including instructions, and a plurality of sensors 110. The instructions, when executed by the processor, may cause the processor to operate as a plurality of operation sections. Thereby, the apparatus 100 may be regarded as comprising a data input section 120, a healthy data distribution generator 130, a status estimator 170, and an anomalous sensor detector 190.

The plurality of sensors 110 may include one or more sensors that detect physical quantities such as temperature, light, pressure, sound and the like. Each sensor continuously, continually, or intermittently outputs the detected physical quantity.

Thus, each of the plurality of sensors 110 may output sensor data with respect to time. In one embodiment, the sensor data with respect to time may be sequential sensor data. The plurality of sensors can be regarded to output a plurality of sequential sensor data. Each sequential sensor data of a sensor can be divided by a predetermined time duration into a plurality of sensed values.

At least part of the plurality of sequential sensor data may include anomalous sensed value. Sensors that temporarily or permanently output anomalous sensed values may be referred to as "anomalous sensors."

The plurality of sensors 110 may provide the status estimator 170 with the plurality of the sequential sensor data to be monitored. In one embodiment, the plurality of sensors 110 may provide the status estimator 170 with the plurality of sequential sensor data as new sensor data.

The data input section 120 may obtain a plurality of healthy sensor data. The plurality of healthy sensor data may not include anomalous sensed values, and values thereof can be regarded as normal. Each of the healthy sensor data may include a plurality of sensed values of a corresponding sensor among a plurality of sensors in normal operation. The plurality of healthy sensor data may be used as training data of the apparatus 100. The data input section 120 may provide the healthy data distribution generator 130 with the plurality of healthy sensor data.

The healthy data distribution generator 130 may generate a healthy data distribution of at least two sensors among the plurality of sensors based on the plurality of healthy sensor data. In one embodiment, the healthy data distribution generator 130 may generate a plurality of the healthy data distributions, corresponding to a plurality of pairs of two healthy sensors.

The healthy data distribution generator 130 may generate an anomalous data distribution of at least two sensors among the plurality of sensors. The healthy data distribution generator 130 may provide the status estimator 170 with the healthy data distribution and the anomalous data distribution.

The status estimator 170 may generate a function of a status probability distribution of the plurality of sensors with respect to time under the condition of sensor data with respect to time. The status estimator 170 may generate the function of the status probability distribution based on the healthy data distribution and an anomalous data distribution. The function of a status probability distribution can be used to determine a status probability distribution.

The status estimator 170 may further receive the new sensor data from the sensors 110, and may estimate the status probability distribution from the new sensor data, based on the function of a status probability distribution. The status of the plurality of sensors may indicate whether the corresponding sensor is currently healthy or anomalous. The status estimator 170 may estimate a score of each status from each sensed value of the new sensor data, based on the status probability distribution. Each score represents a degree of anomaly of each sensed value from the new sensor data. The status estimator 170 may provide the anomalous sensor detector 190 with the estimated scores.

The anomalous sensor detector 190 may detect a sensor outputting an anomalous sensed value from the plurality of sensors 110 by comparing the score of each status with a threshold value. In one embodiment, the anomalous sensor detector 190 may determine that a sensor outputting sequential sensor data that includes at least one sensed value, the score of which exceeds the threshold value, is anomalous.

Thereby, the anomalous sensor detector 190 may determine whether each of the plurality of sensors is healthy or anomalous from the new sensor data based on the status probability distribution of the new sensor data.

As described in relation with FIG. 1, the apparatus 100 generates a healthy data distribution of sensor data of the healthy sensors, generates a function of a status probability distribution with respect to time based on the healthy data distribution, and then estimates the score representing a probability of anomaly of a sensor based on the function of the status probability distribution with respect to time.

Thereby, the apparatus 100 can determine whether each sensed value in the sequential sensor data of the plurality of sensors 110 is anomalous in an absolute sense, since the apparatus 100 can evaluate a probability density of sensor data in the healthy data distributions. The apparatus 100 can utilize temporal information of the new sensor data when performing this determination.

Although the apparatus 100 comprises the plurality of sensors 110 in the embodiment of FIG. 1, the plurality of sensors may be implemented outside of the apparatus in other embodiments.

Figure 2:
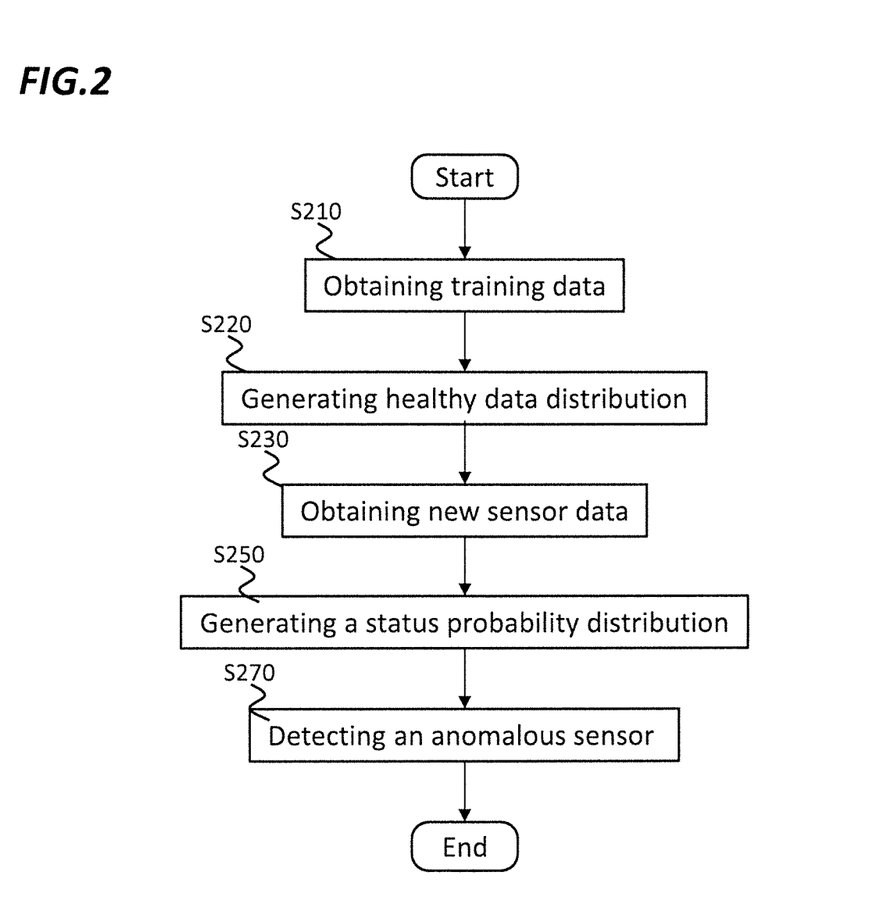
FIG. 2 shows an operational flow of an exemplary configuration of an apparatus, according to an embodiment of the present invention.

FIG. 2 shows an operational flow of an exemplary configuration of an apparatus, according to an embodiment of the present invention. The present embodiment describes an example in which an apparatus, such as the apparatus 100, performs the operations from S210 to S270, as shown in FIG. 2, but operation flow may be performed by other apparatuses. FIG. 2 shows one example of the operational flow of the apparatus 100 shown in FIG. 1, but the apparatus 100 shown in FIG. 1 is not limited to using this operational flow.

First, at S210, a data input section, such as the data input section 120, may obtain a plurality of healthy sensor data. The data input section may obtain a plurality of sensed values of a plurality of sensors (e.g., the plurality of sensor 110) that are initially labelled as healthy (or normal) for use as training data.

Figure 3:
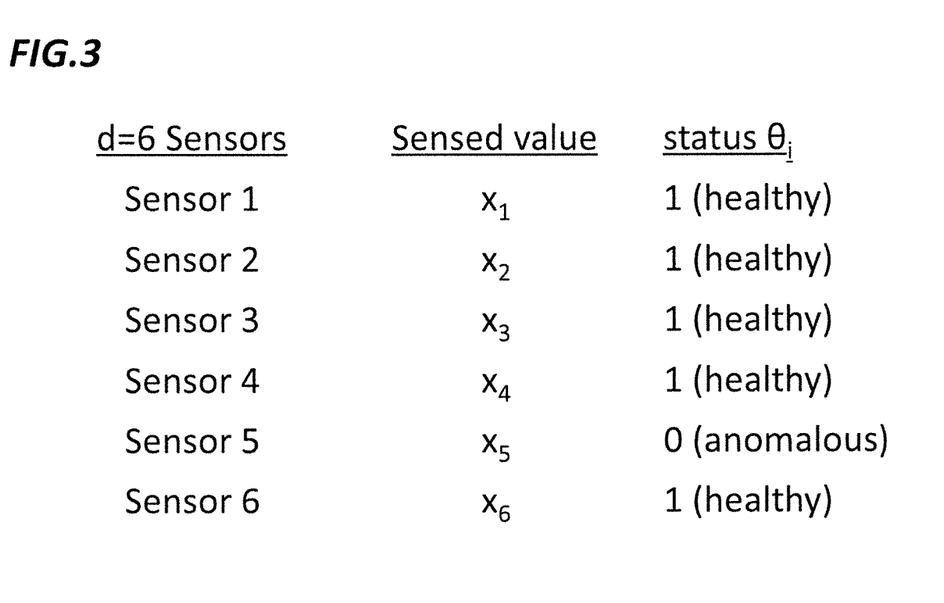
FIG. 3 shows a table of parameters and values of a plurality of sensors, according to an embodiment of the present invention.

FIG. 3 shows a table of parameters and values of a plurality of sensors, according to an embodiment of the present invention. In this embodiment, the apparatus may include 6 sensors, which output sensed values $x_1, \ldots, x_6$ each. Sensed values $x_1, x_2, x_3, x_4,$ and $x_6$ of the sensors 1-4 and 6 are labelled as healthy, and sensor data of the sensor 5 is labelled as anomalous.

A status $\theta$, which indicates that each sensor is healthy or anomalous, is allocated to the plurality of sensors. A value of the status $\theta_1, \theta_2, \theta_3, \theta_4, \theta_6$ of 1 indicates a healthy sensor, and a value of the status $\theta_5$ of 0 indicates an anomalous sensor. In this embodiment, the data input section may obtain the sensed values of sensors 1-4 and 6 among the plurality of healthy sensor data at S210. The data input section may provide a healthy data distribution generator with the plurality of healthy sensor data.

Next, at S220, a healthy data distribution generator, such as the healthy data distribution generator 130, may generate a healthy data distribution of at least two sensors among the plurality of sensors based on the plurality of healthy sensor data. In one embodiment, the healthy data distribution generator may generate a healthy data distribution of a pair of healthy sensors among the plurality of sensors.

Figure 4:
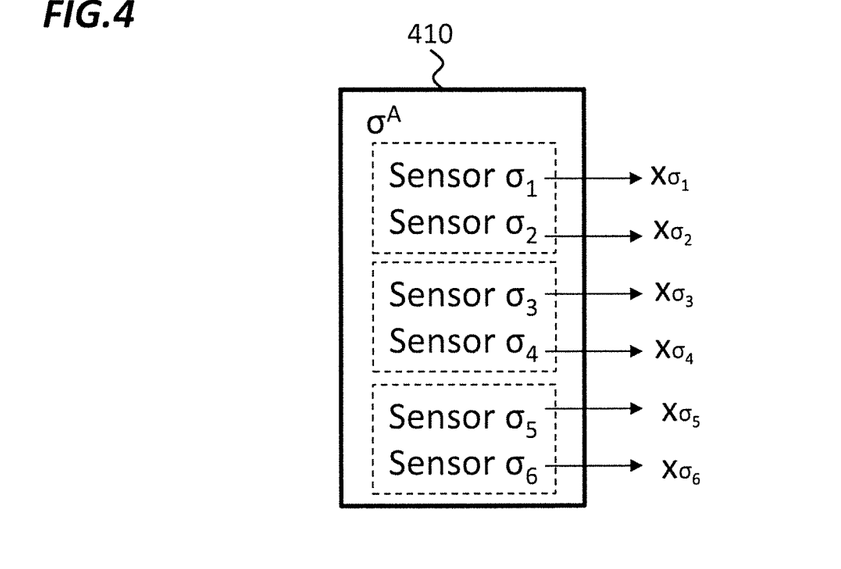
FIG. 4 shows pairs of a plurality of sensors, according to an embodiment of the present invention.

FIG. 4 shows pairs of a plurality of sensors 410, according to an embodiment of the present invention. The plurality of sensors 410 may be numbered with a sensor number variable $\sigma_n$. In the embodiment of FIG. 4, 6 healthy sensors are numbered as sensor $\sigma_1, \sigma_2, \ldots, \sigma_6$. The n-th sensor $\sigma_n$ outputs sensor data $x_{\sigma_n}$, as described in FIG. 4.

In one embodiment, the 2i-th sensor and the (2i−1)-th sensor are paired for each value of i, where i is a positive integer from 1 to D/2, where D is the number of sensors. In the embodiment of FIG. 4, the sensor $\sigma_1$ and the sensor $\sigma_2$ are paired, the sensor $\sigma_3$ and the sensor $\sigma_4$ are paired, and the sensor $\sigma_5$ and the sensor $\sigma_6$ are paired.

The pairing described in FIG. 4 is referred to as a partition $\sigma^A$. The 6 sensors can be grouped into pairs in different manners. For example, the i-th sensor and the (D−i+1)-th sensor may be paired, for each i, where D is a number of sensors, and i is an integer from 1 to D. All possible partitions may be referred to as a set $S_D$.

Figure 5:
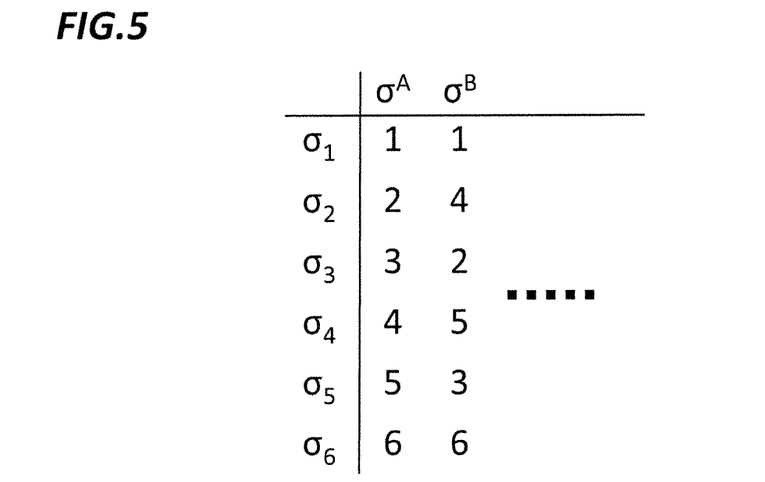
FIG. 5 shows a partial table of multiple partitions of a plurality of sensors, according to an embodiment of the present invention.

FIG. 5 shows a partial table of multiple partitions of a plurality of sensors, according to an embodiment of the present invention. In the embodiment of the 6 healthy sensors, the partition $\sigma^A$ sets $\sigma_1, \sigma_2, \sigma_3, \sigma_4, \sigma_5, \sigma_6$, to 1, 2, 3, 4, 5, 6 and the partition $\sigma^B$ sets $\sigma_1, \sigma_2, \sigma_3, \sigma_4, \sigma_5, \sigma_6$ to 1, 4, 2, 5, 3, 6. The set $S_D$ may include other partitions.

The healthy data distribution of pairs of sensors may be expressed by $p(x_{o2i-1}, x_{o2i})$, which represents a probability that a sensed value $x_{o2i-1}$ of the healthy sensor $\sigma_{2i-1}$ and a sensed value $x_{o2i}$ of the healthy sensor $\sigma_{2i}$ are both observed, where i represents an integer between 1 and D/2, inclusive. The healthy data distribution generator may learn $p(x_{o2i-1}, x_{o2i})$ by density estimation method such as the kernel density estimation, based on the healthy sensor data. Thereby, the healthy data distribution generator learns two dimensional densities $p(x_{o2i-1}, x_{o2i})$.

In the embodiment of FIGS. 4-5, the healthy data distribution generator may generate $p(x_1, x_2), p(x_3, x_4), p(x_{o5}, x_6)$ for the partition $\sigma^A$, and $p(x_1, x_4), p(x_2, x_5), p(x_{o3}, x_6)$ for the partition $\sigma^B$. The healthy data distribution generator may generate other $p(x_{o2i-1}, x_{o2i})$ for partitions included in the set $S_D$. The healthy data distribution generator may generate $p(x_i, x_j)$ for all or some of the possible pairs of sensed values of healthy sensors $(x_i, x_j)$.

The healthy data distribution generator may also generate an anomalous data distribution of at least two sensors among the plurality of sensors. At least one of the at least two sensors is an anomalous sensor. In one embodiment, the healthy data distribution generator may generate the anomalous data distribution of a pair of sensors among the plurality of sensors. The anomalous data distribution of pairs of sensors may be expressed by $u(x_{o2i-1}, x_{o2i})$.

In one embodiment, the healthy data distribution generator may generate the anomalous data distribution $u(x_{o2i-1}, x_{o2i})$, which is approximated with a uniform distribution. In one embodiment, the healthy data distribution generator may obtain a sensed values from the anomalous sensor(s), and may generate the anomalous data distribution $u(x_{o2i-1}, x_{o2i})$ from the sensed values from the anomalous sensor(s). The healthy data distribution generator may provide a parameter estimator with the healthy data distribution $p(x_{o2i-1}, x_{o2i})$ and the anomalous data distribution $u(x_{o2i-1}, x_{o2i})$.

Next, at S230, a plurality of sensors, such as the plurality of sensors 110, may obtain new sensor data with respect to time $X_{new}$. The new sensor data may include D-tuple sequential sensor data of D-tuple sensors 110. The plurality of sensors provide the new sensor data with the parameter estimator.

In one embodiment, the new sensor data $X_{new}$ may include sequential sensor data for a sensor 1, which are $x^{(1)}_1, x^{(2)}_1, x^{(3)}_1, \ldots x^{(N)}_1$, sequential sensor data for a sensor 2, which are $x^{(1)}_2, x^{(2)}_2, x^{(3)}_2, \ldots, x^{(N)}_2, \ldots$, sequential sensor data for a D-th sensor $x^{(1)}_D, x^{(2)}_D, x^{(3)}_D, \ldots, x^{(N)}_D$, where N is the time duration in units of data senses of the sequential sensor data. The plurality of sensors may provide the status estimator with the new sensor data $X_{new}$.

Next, at S250, the status estimator, such as the status estimator 170, may generate a function of a status probability distribution of the plurality of sensors with respect to time under the condition of sensor data with respect to time from the healthy data distribution $p(x_{o2i-1}, x_{o2i})$ and the anomalous data distribution $u(x_{o2i-1}, x_{o2i})$.

In order to explain the function of the status probability distribution, we first define the data distribution $p(x^{(n)}|\theta^{(n)})$. The status probability distribution may be derived from the data distribution $p(x^{(n)}|\theta^{(n)})$.

The data distributions may be expressed by $p(x^{(n)}|\theta^{(n)})$, as shown in a formula (1) below, where $x^{(n)}_{\sigma*}$ represents a sensed value of $\sigma*$-th sensor at the time (n), and $\theta^{(n)}_{\sigma*}$ represents the status of the $\sigma*$-th sensor at the time (n).

$$p(x^{(n)}|\theta^{(n)}) := \qquad (1)$$

$$\frac{1}{|S_D|}\sum_{\sigma \in S_D}\prod_{i=1}^{D/2} p(x^{(n)}_{\sigma 2i-1}, x^{(n)}_{\sigma 2i})^{\theta^{(n)}_{\sigma 2i-1}\theta^{(n)}_{\sigma 2i}} u(x^{(n)}_{\sigma 2i-1}, x^{(n)}_{\sigma 2i})^{1-\theta^{(n)}_{\sigma 2i-1}\theta^{(n)}_{\sigma 2i}}$$

As the formula (1) indicates, when sensors $(x^{(n)}_{o2i-1}, x^{(n)}_{o2i})$ in each pair are both healthy, $p(x^{(n)}_{o2i-1}, x^{(n)}_{o2i})$ contributes to the data distribution instead of $u(x^{(n)}_{o2i-1}, x^{(n)}_{o2i})$, and when at least one sensor of each pair $(x^{(n)}_{o2i-1}, x^{(n)}_{o2i})$ is anomalous, $u(x^{(n)}_{o2i-1}, x^{(n)}_{o2i})$ contributes to the data distribution instead of $p(x^{(n)}_{o2i-1}, x^{(n)}_{o2i})$. For example, if the sensors 1-4 and sensor 6 are healthy at the time (n) and the sensor 5 is anomalous at the time (n), the data distribution $p(x^{(n)}_1, \ldots, x^{(n)}_6 | \theta^{(n)}_1, \ldots \theta^{(n)}_6 = \{1, 1, 1, 1, 0, 1\})$ may be estimated with $\{p(x^{(n)}_1, x^{(n)}_2) \times p(x^{(n)}_3, x^{(n)}_4) \times u(x^{(n)}_5, x^{(n)}_6)\} + \{p(x^{(n)}_1, x^{(n)}_3) \times u(x^{(n)}_2, x^{(n)}_5) \times p(x^{(n)}_4, x^{(n)}_6)\} + \ldots$ for all partitions in the set $S_D$.

Here, the data distribution $p(x^{(n)}|\theta^{(n)})$ is represented by the sum of exponentially many components in the formula (1). $p(x^{(n)}|\theta^{(n)})$ of the formula (1) may be approximated into another formula in order to reduce the computation.

Let the (i, i')-th entry of the matrix $L(x) \in R^{D \times D}$ be $$L_{ii'}(x) := \frac{1}{D-1} \log q(x_i, x_{i'})/u(x_i, x_{i'}).$$

The status probability distribution may be regarded as posterior distribution of the status of sensors when $X_{new}$ is regarded as an observation. The status probability distribution may be represented by: $p(\{\theta^{(n)}\}_{n=1}^N, \mu | \{x^{(n)}\}_{n=1}^N, a, b)$, wherein $\{x^{(n)}\}_{n=1}^N$ represents the sequential sensor data of each sensor in the new data $X_{new}$. The status probability distribution is expressed by the following formula (2) according to the Bayes rules:

$$p\Big(\{\theta^{(n)}\}_{n=1}^N, \mu \Big| \{x^{(n)}\}_{n=1}^N, a, b\Big) = \frac{1}{Z} p\Big(\{x^{(n)}\}_{n=1}^N, \{\theta^{(n)}\}_{n=1}^N \Big| \mu\Big) p(\mu | a, b) \qquad (2)$$

where Z is a normalization factor.

The formula (2) represents a two-layer model. $p(\{x^{(n)}\}_{n=1}^N, \{\theta^{(n)}\}_{n=1}^N | \mu)$ corresponds to the first layer, and $p(\mu|a,b)$ corresponds to the second layer. At the first layer, the probability distribution of sensed value $x^{(n)}$ and status $\theta^{(n)}$ is based on a latent factor $\mu$, and at the second layer, the probability distribution of the latent factor $\mu$ is based on the distribution factors a and b.

The formula (2) is represented by a formula (3) according to a weight decay model, in which the status of the relatively recent sensed value is weighted relatively heavily.

$$p(\{\theta^{(n)}\}_{n=1}^N, \mu | \{x^{(n)}\}_{n=1}^N, a, b) = \qquad (3)$$

$$\frac{1}{Z} p(\mu | a, b) \prod_{n=1}^{N} [p(x^{(n)} | \theta^{(n)}) p(\theta^{(n)} | \mu)]^{\eta^{N-n}}$$

The right side of the formula (3) includes a product of the data distributions with respect to time under the condition of status of the plurality of sensors $p(x^{(n)}|\theta^{(n)})$ for $n=1, \ldots, N$. The product of the data distribution $p(x^{(n)}|\theta^{(n)})$ is obtained by inputting the condition of status $\theta^{(n)}$ and the sensed value $x^{(n)}$ at each time (n) into the data distribution $p(x|\theta)$ generated at S230.

Thus, the function of the status probability distribution may be regarded as being based on the product of the data distributions with respect to time under the condition of status of the plurality of sensors.

The right member of the formula (3) also includes Beta prior distributions $p(\mu|a,b)$. Each $\mu$ of $p(\mu|a,b)$ may represent a Beta prior distribution of each sensor, parameterized by a and b. In one embodiment, variable $\mu_i$ is the latent factor of the status $\theta^{(n)}_i$, which represents how likely $\theta^{(n)}_i$ is 0 (i.e., how likely an anomalous value is detected by the i-th sensor at the n-th time duration). Variables a and b are distribution parameters of the Beta prior distributions $p(\mu|a,b)$. $p(\mu|a,b)$ may be represented by a formula (4):

$$p(\mu | a, b) := \prod_{i=1}^{D} \frac{1}{B(a_i, b_i)} \mu_i^{a_i-1} (1-\mu_i)^{b_i-1} \qquad (4)$$

Because the right side of the formula (3) includes prior distribution $p(\theta^{(n)}|\mu)$ of the status $\theta^{(n)}$, the prior distribution of status $\theta^{(n)}$ is based on a value of the latent factor $\mu$. Therefore, the function of the status probability distribution may be regarded as being based on Beta prior distributions.

A decay factor $\eta \in (0, 1]$ on the right side of the formula (3) represents how much the influence of a past output of $p(x^{(n)}|\theta^{(n)})p(\theta^{(n)}|\mu)$ on the status probability distribution is reduced. Thereby, the function of the status probability distribution is based on the data distributions $p(x^{(n)}|\theta^{(n)})$ having newer data distributions (i.e., having greater n) weighted more than older data distributions (i.e., having smaller n). In one embodiment, $\eta$ may be 1, and the status estimator may not consider time decay.

In the embodiment, since the status estimator only uses two dimensional density estimation for pairs of sensors in the data distribution $p(x^{(n)}|\theta^{(n)})$, and does not use high dimensional density estimation such as $p(x_\theta)$ for all sensors, the status estimator can avoid computationally costly estimation of $p(x_\theta)$.

The status probability distribution of the formula (3) may be approximated with a Bernoulli distribution. In the embodiment, the status estimator may estimate the status probability distribution of the formula (3) from the new sensor data by using a Bernoulli distribution as a prior distribution of the plurality of status. In one embodiment, a prior distribution of the status $\theta$ is expressed by a following Bernoulli distribution (5):

$$p(\theta^{(n)}|\mu) = \Pi_{i=1}^{D} \mu_i^{\theta_i^{(n)}} (1-\mu_i)^{1-\theta_i^{(n)}} \tag{5}$$

The status estimator may estimate the formula (3) by using the data distribution $p(x|\theta)$ of the formula (1), $p(\mu|a,b)$ of the formula (4), and $p(\theta^{(n)}|\mu)$ of the formula (5).

The status probability distribution of the formula (3) may be further approximated into another formula. In one embodiment, the posterior distribution is approximated with the Bernoulli distribution with respect to time $p(\theta^{(n)}|v^{(n)})$ as shown in $p(\{\theta^{(n)}\}_{n=1}^{N}, \mu | \{x^{(n)}\}_{n=1}^{N}, a,b) \approx p(\mu|\alpha, \beta) \Pi_{n=1}^{N} p(\theta^{(n)}|v^{(n)})$.

The approximation of the function of the status probability distribution includes updating parameters of the Beta prior distributions $p(\mu|\alpha,\beta)$ and the Bernoulli distribution $p(\theta^{(n)}|v^{(n)})$ to reduce a difference caused by an approximation. In one embodiment, the status estimator may find the parameters $\{v^{(n)}\}_{n=1}^{N}$, $\alpha$ and $\beta$ that best approximate the posterior, where variables $\alpha$ and $\beta$ are distribution parameters of the Beta prior distribution $p(\mu|\alpha, \beta)$. Finding these values amounts to finding the minimizer of the KL-divergence $D_{KL}[p(\mu|\alpha,\beta)\Pi_{n=1}^{N} p(\theta^{(n)}|v^{(n)}) \| p(\{\theta^{(n)}\}_{n=1}^{N}, \mu|\{x^{(n)}\}_{n=1}^{N}, a,b)]$.

Further approximation can be performed on this KL-divergence. While the exact computation of $p(x^{(n)}|\theta^{(n)})$ in the KL-divergence takes exponential times, the status estimator may use its upper bound as an alternative object function. The status estimator may solve a problem as shown in a formula (6):

$$\{v^{(n)}\}_{n=1}^{N}, \alpha, \beta = \underset{v,\alpha,\beta}{\mathrm{argmin}} \tag{6}$$

$$\sum_{n=1}^{N} \left[ \sum_{i=1}^{D} \{v_i^{(n)} \log v_i^{(n)} + (1-v_i^{(n)})\log(1-v_i^{(n)})\} - \frac{1}{2} v^{(n)T} L(x^{(n)}) v^{(n)} \right] +$$

$$\sum_{i=1}^{D} \left\{ \left( \alpha_i - \sum_{n=1}^{N} \eta^{N-n} v_i^{(n)} \right) \log\left(\alpha_i - \frac{1}{2}\right) + \right.$$

$$\left( \beta_i - \sum_{n=1}^{N} \eta^{N-n}(1-v_i^{(n)}) \right) \log\left(\beta_i - \frac{1}{2}\right) -$$

$$\left( \alpha_i + \beta_i - \sum_{n=1}^{N} \eta^{N-n} - a_i - b_i \right) \log\left(\alpha_i + \beta_i - \frac{1}{2}\right) -$$

-continued $$a_i \log\left(\alpha_i - \frac{1}{2}\right) - b_i \log\left(\beta_i - \frac{1}{2}\right) - \left(\alpha_i - \frac{1}{2}\right) \log \alpha_i -$$

$$\left. \left(\beta_i - \frac{1}{2}\right) \log \beta_i + \left(\alpha_i + \beta_i - \frac{1}{2}\right) \log(\alpha_i + \beta_i) \right\}$$

The status estimator may solve the formula (6) by using the coordinate descent method.

In one embodiment, the status estimator may determine $v^{(n)}$, $\alpha$ and $\beta$ for the entire duration (n=1, ... ,N) to generate the function of the status probability distribution whenever the status estimator receives the latest data $\{x_i^{(N)}\}_{i=1}^{D}$ of the new sensor data. In other embodiments, the status estimator may determine only $v^{(N)}$, $\alpha$ and $\beta$ for the latest duration (n=N) for the latest sensor data input $\{x_i^{(N)}\}_{i=1}^{D}$. In the embodiment, the status estimator may fix $\{v^{(n)}\}_{n=1}^{N-1}$ to those already derived from the past estimation.

The status estimator may determine $v^{(n)}$, $\alpha$ and $\beta$ by solving the problem as shown in a formula (7):

$$v^{(N)}, \alpha, \beta = \tag{7}$$

$$\underset{v,\alpha,\beta}{\mathrm{argmin}} \sum_{i=1}^{D} \{v_i^{(N)} \log v_i^{(N)} + (1-v_i^{(N)})\log(1-v_i^{(N)})\} - \frac{1}{2} v^{(N)T} L(x^{(N)}) v^{(N)} +$$

$$\sum_{i=1}^{D} \left\{ (\alpha_i - v_i^{(N)})\log\left(\alpha_i - \frac{1}{2}\right) + (\beta_i - (1-v_i^{(N)}))\log\left(\beta_i - \frac{1}{2}\right) - \right.$$

$$(\alpha_i + \beta_i - \zeta^{(N)} - a_i - b_i)\log\left(\alpha_i + \beta_i - \frac{1}{2}\right) -$$

$$a_i^{(N)} \log\left(\alpha_1 - \frac{1}{2}\right) - b_d^{(N)} \log\left(\beta_i - \frac{1}{2}\right) - \left(\alpha_i - \frac{1}{2}\right) \log \alpha_i -$$

$$\left. \left(\beta_i - \frac{1}{2}\right) \log \beta_i + \left(\alpha_i + \beta_i - \frac{1}{2}\right) \log(\alpha_i + \beta_i) \right\}$$

where $\zeta^{(N)} := \sum_{n=1}^{N} \eta^{N-n} = 1 + \eta \zeta^{(N-1)}$, $a_i^{(N)} := a_i + \sum_{n=1}^{N-1} \eta^{N-n} v_i^{(n)} = (1-\eta) a_i + \eta (a_i^{(N-1)} + v_i^{(N-1)})$, $b_i^{(N)} := b_i \sum_{n=1}^{N-1} \eta^{N-n}(1-v_i^{(n)}) = (1-\eta)b_i + \eta(b_i^{(N-1)} + 1 - v_i^{(N-1)})$.
Thereby, the status estimator may reduce computational complexity by solving only $v^{(N)}$, $\alpha$ and $\beta$.

Figure 6:
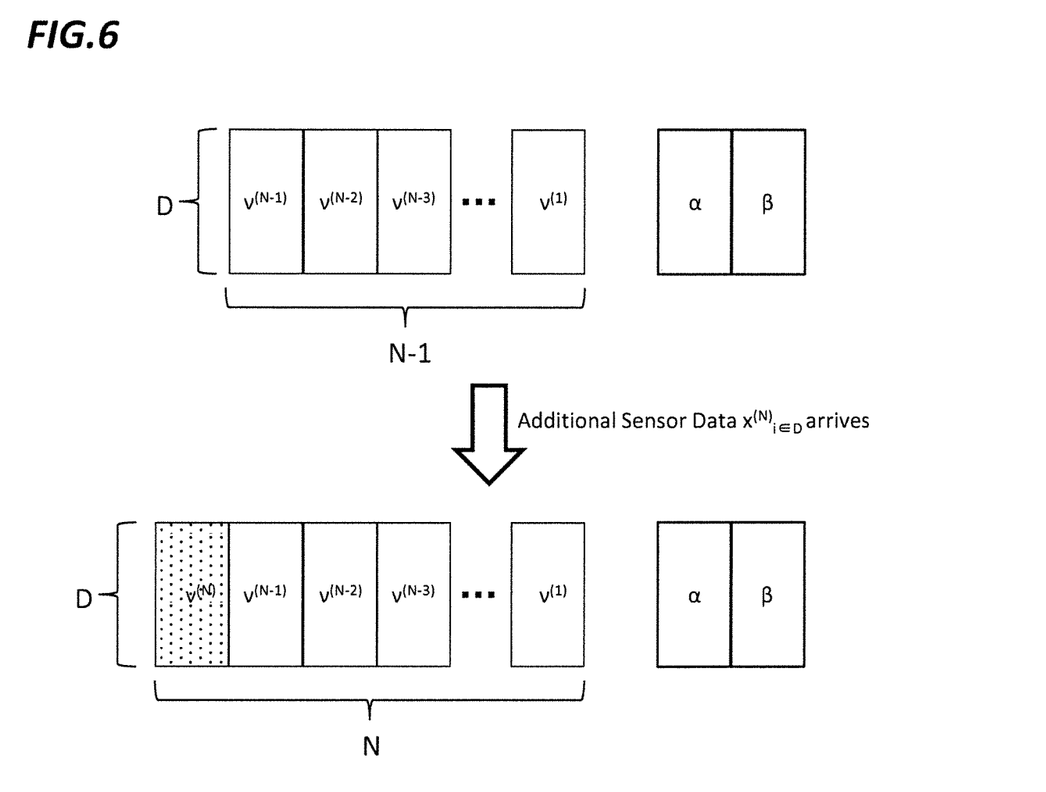
FIG. 6 shows a sequence of estimation of new sensor data, according to an embodiment of the present invention.

FIG. 6 shows a sequence of estimation of new sensor data, according to an embodiment of the present invention. At the time (N−1), the status estimator has determined $\alpha$, $\beta$, and $v^{(1)}, v^{(2)}, \ldots, v^{(N-1)}$ for D sensors. Here, the status estimator receives additional sensor data $\{x^{(N)}_i\}_{i=1}^{D}$ of D sensors at a new time (N). The status estimator only estimates $\alpha$, $\beta$, and $v^{(N)}$ (i.e., D+2 parameters) by solving the formula (7) instead of estimating $\alpha$, $\beta$, and $v^{(1)}, v^{(2)}, \ldots, v^{(N)}$ (i.e., D×N+2 parameters).

Instead of the weight decay model explained regarding the formulas (3)-(7), the formula (2) is further represented by a sliding window model, in which status of the sensed values of recent predetermined duration is weighted.

By the sliding window model, the function of the status probability distribution is based on the data distributions with respect to a first period of time (a period from n=N−M+1 to N) under the condition of status of the plurality of sensors $p(\{x^{(n)}\}_{n=N-M+1}^{N} | \{\theta^{(n)}\}_{n=N-M+1}^{N})$. The formula (2) is represented by a formula (8) according to the sliding window.

$$p\left(\{\theta^{(n)}\}_{n=1}^{N}, \mu | \{x^{(n)}\}_{n=1}^{N}, a, b\right) \approx \frac{1}{Z} p(\{x^{(n)}\}_{n=N-M+1}^{N}, \{\theta^{(n)}\}_{n=N-M+1}^{N}|\mu) \tag{8}$$

-continued $$p(\mu | a, b) = \frac{1}{Z} p(\mu | a, b) \prod_{n=N-M+1}^{N} [p(x^{(n)} | \theta^{(n)}) p(\theta^{(n)} | \mu)]$$

The status probability distribution of the formula (8) may be approximated into another formula as shown in $p(\{\theta^{(n)}\}_{n=1}^{N}, \mu | \{x^{(n)}\}_{n=1}^{N}, a, b) \approx p(\mu | \alpha, \beta) \prod_{n=N-M+1}^{N} p(\theta^{(n)} | v^{(n)})$ in a manner similar to the weight decay model. The status estimator may estimate the function of the status probability distribution by approximating a parameter $\alpha$, $\beta$ of a Bernoulli distribution for the new sensor data with respect to the first period of time. In one embodiment, the status estimator may find the minimizer of the KL-divergence $D_{KL}[p(\mu | \alpha, \beta) \prod_{n=1}^{N} p(\theta^{(n)} | v^{(n)}) \| p(\{\theta^{(n)}\}_{n=N-M+1}^{N}, \mu | \{x^{(n)}\}_{n=N-M+1}^{N}, a, b)]$ of the approximated formula in a manner similar to the weight decay model. In one embodiment, the status estimator may estimate the status probability distribution from the new sensor data by using a coordinate descent method.

In one embodiment, the status estimator may determine $v^{(n)}$, $\alpha$ and $\beta$ for all duration ($n=1, \ldots, N$) whenever the status estimator receives the latest data $\{x_i^{(N)}\}_{i=1}^{D}$ of the new sensor data. In another embodiment, the status estimator may determine only $v^{(N)}$, $\alpha$ and $\beta$ for the latest duration ($n=N$) for the latest sensor data input $\{x_i^{(N)}\}_{i=1}^{D}$.

For example, the status estimator may estimate the function of the status probability distribution by approximating a parameter of a Bernoulli distribution for the new sensor data with respect to a second period of time (e.g., $n=N$) and using a parameter of a Bernoulli distribution for previous data with respect to a third period of time (e.g., $n=N-M+1, N-M+2, \ldots, N-1$), the third period of time being previous to the second period of time.

Here, the status estimator may estimate a score of each status $\theta$ from a new sensor data $X_{new}$ obtained at S230. In one embodiment, by utilizing the function of the status probability distribution, the status estimator may obtain a value of $v$ of the formula (6)-(7) from a value of a new sensor data $X_{new}$, and then estimate a status probability distribution $p(\theta_i^{(N)} | X_{new})$ for each sensor i based on the approximation of the Bernoulli distribution from the new sensor data $X_{new}$ as the score of each status $\theta$.

Each score $s_i^{(n)} := p(\theta_i^{(n)} | X_{new})$ may represent at least one probability that the corresponding sensor is anomalous. For example, if a value of $p(\theta_i^{(n)} = 0 | X_{new})$ is 0.6, then the probability that a sensor i is anomalous at the time (n) is 60%.

In one embodiment, the status estimator estimates the score $p(\theta_i^{(n)} = 1 | x_{new})$, which represents a probability that a sensor i at the time (n) is healthy. The status estimator may provide an anomalous sensor detector with the estimated score.

Next, at S270, an anomalous sensor detector, such as the anomalous sensor detector 190, may detect the anomalous sensor based on the scores of each sensor. In one embodiment, the anomalous sensor detector may compare the score $s_i^{(n)}$ of (n)-th time value of i-th sensor with a threshold value. If the score $s_i^{(n)}$ exceeds the threshold value, then the anomalous sensor detector may determine that the i-th sensor is anomalous, or not healthy.

As described in relation to FIGS. 2-5, the apparatus can estimate a degree of anomaly of sensors in an absolute sense. In particular, the apparatus estimates a probability that each sensor is anomalous by utilizing the two dimensional probability density and the Bayesian model. In some embodiments, the apparatus may identify anomalous sensors without setting particular conditions of anomalous sensors, such as a condition to detect anomalous sensor when a sensed value is within a range. Furthermore, the apparatus can reduce computation required for the estimation by utilizing a variety of approximation methods.

Figure 7:
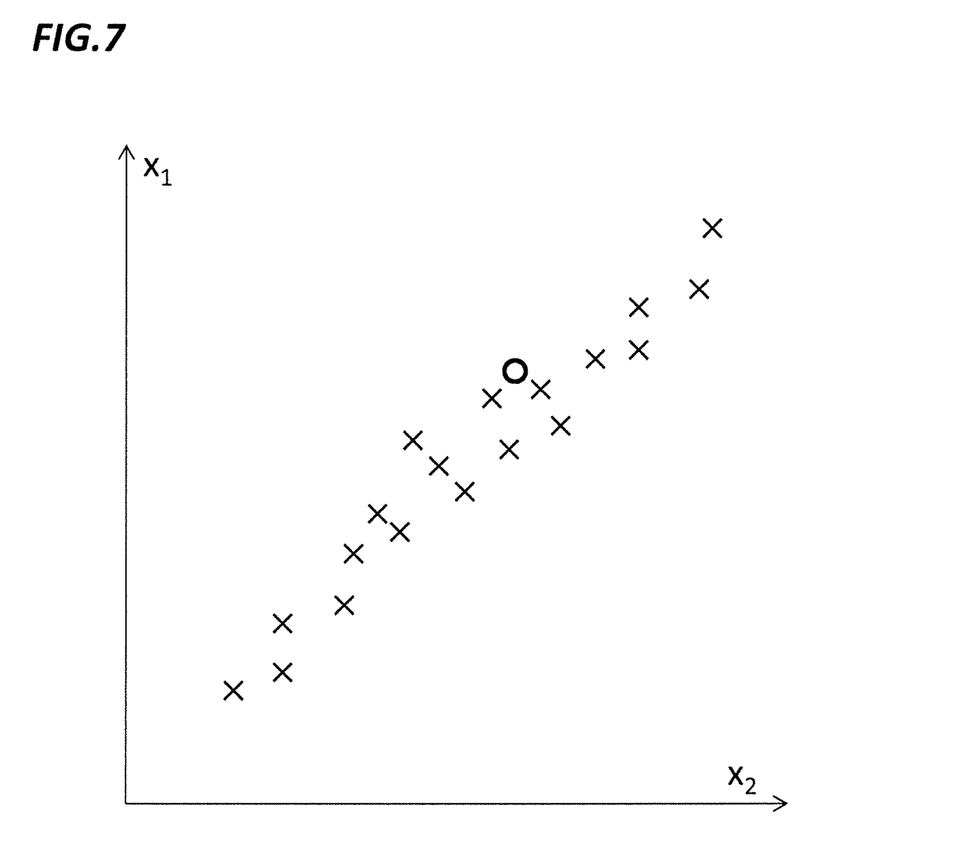
FIG. 7 shows one example of a relationship of sensor data between two sensors, according to an embodiment of the present invention.

FIG. 7 shows one example of a relationship of sensor data between two sensors, according to an embodiment of the present invention. Points "X" in the graph represent position coordinates corresponding to sensor data $x_i$ of a sensor 1 and sensor data $x_2$ of a sensor 2 in training data.

A point "O" in the graph represents a position coordinate corresponding to new sensor data of the sensor 1 and sensor data $x_2$ of the sensor 2. A probability $p(x_1, x_2)$ corresponding to the area where points X are aggregated may be high.

As shown in FIG. 7, the new sensor data "O" is located generally in an area where the probability $p(x_1, x_2)$ is high. Therefore, the apparatus may determine that the new sensor data is healthy in relation to the sensor 1 and the sensor 2.

Figure 8:
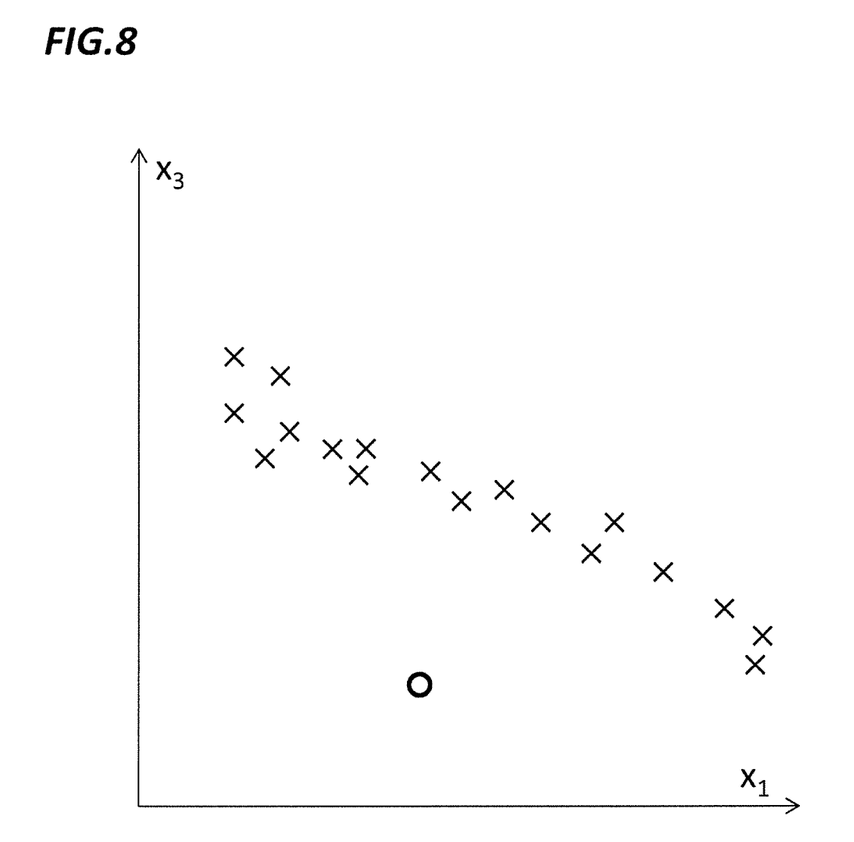
FIG. 8 shows another example of a relationship of sensor data between two sensors, according to an embodiment of the present invention.

FIG. 8 shows another example of a relationship of sensor data between two sensors, according to an embodiment of the present invention. As shown in FIG. 8, the new sensor data "O" is located generally apart from an area where the probability $p(x_1, x_2)$ is high. Therefore, the apparatus may determine that the new sensor data is anomalous in relation to the sensor 1 and the sensor 2.

In the aforementioned embodiments, the healthy data distribution generator may generate the healthy data distribution of two sensors. In other embodiments, the healthy data distribution generator may generate the healthy data distribution of one or more than two sensors. In some embodiments, the healthy data distribution generator may generate the data distribution $p(x | \theta)$ as shown in the formula (9):

$$p(x | \theta) := \sum_{m=1}^{D} \frac{\alpha_m}{|S_D^m|} \sum_{\sigma \in S_D^m} \prod_{i=1}^{|\sigma|} p(x_{\sigma_i})^{\prod_{j \in \sigma_i} \theta_j} u(x_{\sigma_i})^{1 - \prod_{j \in \sigma_i} \theta_j}, \quad (9)$$

where $S_D^m$ represents all possible size m partitions of sensors, $p(x_{\sigma i})$ represents a healthy data distribution of the sensor subset $\sigma_i$, and $u(x_{\sigma i})$ represents an anomalous data distribution (e.g., uniform distribution) of the sensor subset $\sigma_i$. The values of $\alpha_m$ may be preliminary determined by a user, or learned from healthy sensor data.

Figure 9:
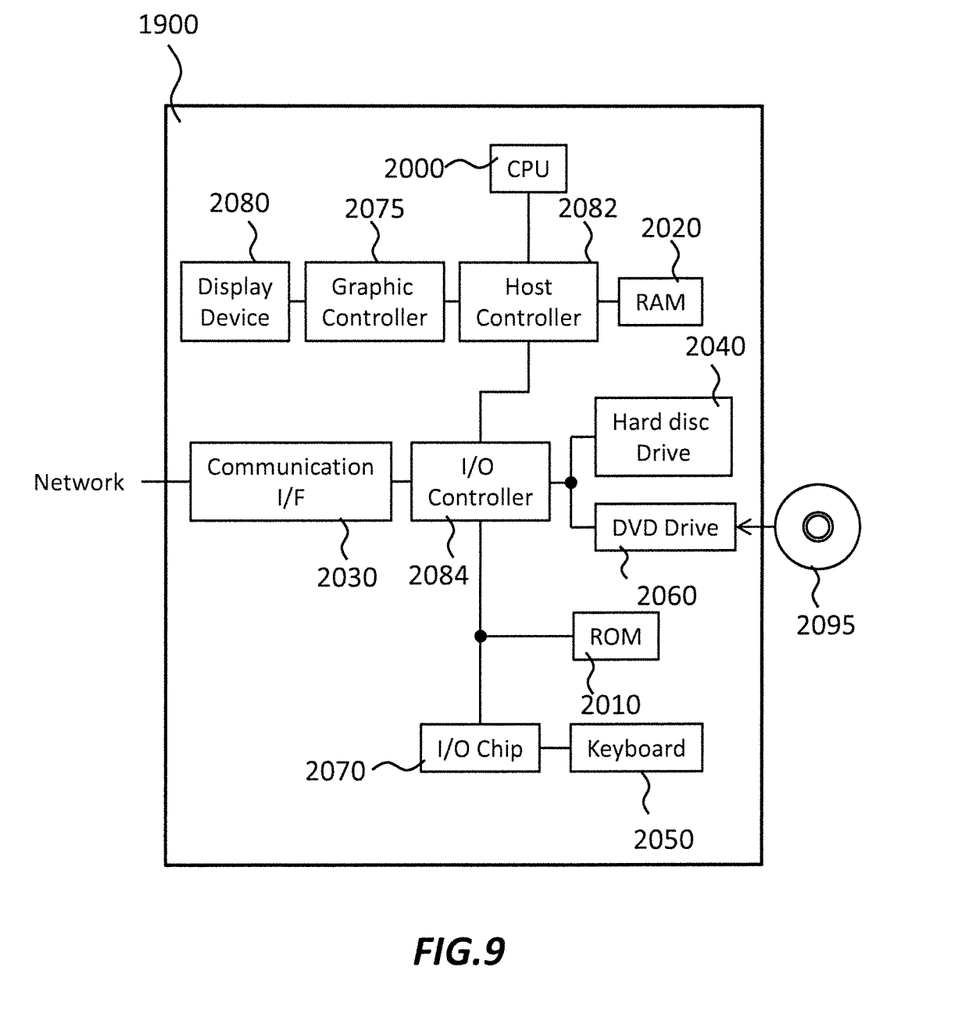
FIG. 9 shows a computer, according to an embodiment of the present invention.

FIG. 9 shows an exemplary configuration of a computer 1900 according to an embodiment of the present invention. The computer 1900 according to the present embodiment includes a CPU 2000, a RAM 2020, a graphics controller 2075, and a display apparatus 2080, which are mutually connected by a host controller 2082. The computer 1900 also includes input/output units such as a communication interface 2030, a hard disk drive 2040, and a DVD-ROM drive 2060, which are connected to the host controller 2082 via an input/output controller 2084. The computer also includes legacy input/output units such as a ROM 2010 and a keyboard 2050, which are connected to the input/output controller 2084 through an input/output chip 2070.

The host controller 2082 connects the RAM 2020 with the CPU 2000 and the graphics controller 2075, which access the RAM 2020 at a high transfer rate. The CPU 2000 operates according to programs stored in the ROM 2010 and the RAM 2020, thereby controlling each unit. The graphics controller 2075 obtains image data generated by the CPU 2000 on a frame buffer or the like provided in the RAM 2020, and causes the image data to be displayed on the display apparatus 2080. Alternatively, the graphics controller 2075 may contain therein a frame buffer or the like for storing image data generated by the CPU 2000.

The input/output controller 2084 connects the host controller 2082 with the communication interface 2030, the hard disk drive 2040, and the DVD-ROM drive 2060, which are relatively high-speed input/output units. The communication interface 2030 communicates with other electronic devices via a network. The hard disk drive 2040 stores programs and data used by the CPU 2000 within the computer 1900. The DVD-ROM drive 2060 reads the programs or the data from a DVD-ROM 2095, and provides the hard disk drive 2040 with the programs or the data via the RAM 2020.

The ROM 2010 and the keyboard 2050 and the input/output chip 2070, which are relatively low-speed input/output units, are connected to the input/output controller 2084. The ROM 2010 stores therein a boot program or the like executed by the computer 1900 at the time of activation, a program depending on the hardware of the computer 1900. The keyboard 2050 inputs text data or commands from a user, and may provide the hard disk drive 2040 with the text data or the commands via the RAM 2020. The input/output chip 2070 connects a keyboard 2050 to an input/output controller 2084, and may connect various input/output units via a parallel port, a serial port, a keyboard port, a mouse port, and the like to the input/output controller 2084.

A program to be stored on the hard disk drive 2040 via the RAM 2020 is provided by a recording medium as the DVD-ROM 2095, and an IC card. The program is read from the recording medium, installed into the hard disk drive 2040 within the computer 1900 via the RAM 2020, and executed in the CPU 2000.

A program that is installed in the computer 1900 may cause the computer 1900 to function as an apparatus, such as the apparatus 100 of FIG. 1. The program or module acts on the CPU 2000, to cause the computer 1900 to function as a section, component, element such as each element of the apparatus 100 of FIG. 1 (e.g., the data input section 120, the healthy data distribution generator 130, the status estimator 170, the anomalous sensor detector 190 and the like).

The information processing described in these programs is read into the computer 1900 such as the apparatus 100 of FIG. 1, to function as the obtaining section, which is the result of cooperation between the program or module and the above-mentioned various types of hardware resources. Moreover, the apparatus is constituted by realizing the operation or processing of information in accordance with the usage of the computer 1900.

For example, in response to communication between the computer 1900 and an external device, the CPU 2000 may execute a communication program loaded onto the RAM 2020, to instruct communication processing to a communication interface 2030, based on the processing described in the communication program.

The communication interface 2030, under control of the CPU 2000, reads the transmission data stored on the transmission buffering region provided in the recording medium, such as a RAM 2020, a hard disk drive 2040, or the DVD-ROM 2095, and transmits the read transmission data to a network, or writes reception data received from a network to a reception buffering region or the like provided on the recording medium. In this way, the communication interface 2030 may exchange transmission/reception data with the recording medium by a DMA (direct memory access) method, or by a configuration that the CPU 2000 reads the data from the recording medium or the communication interface 2030 of a transfer destination, to write the data into the communication interface 2030 or the recording medium of the transfer destination, so as to transfer the transmission/reception data.

In addition, the CPU 2000 may cause all or a necessary portion of the file of the database to be read into the RAM 2020 such as by DMA transfer, the file or the database having been stored in an external recording medium such as the hard disk drive 2040, the DVD-ROM drive 2060 (DVD-ROM 2095) to perform various types of processing onto the data on the RAM 2020. The CPU 2000 may then write back the processed data to the external recording medium by means of a DMA transfer method or the like. In such processing, the RAM 2020 can be considered to temporarily store the contents of the external recording medium, and so the RAM 2020, the external recording apparatus, and the like are collectively referred to as a memory, a storage section, a recording medium, a computer readable medium, etc.

Various types of information, such as various types of programs, data, tables, and databases, may be stored in the recording apparatus, to undergo information processing. Note that the CPU 2000 may also use a part of the RAM 2020 to perform reading/writing thereto on the cache memory. In such an embodiment, the cache is considered to be contained in the RAM 2020, the memory, and/or the recording medium unless noted otherwise, since the cache memory performs part of the function of the RAM 2020.

The CPU 2000 may perform various types of processing, onto the data read from a memory such as the RAM 2020, which includes various types of operations, processing of information, condition judging, search/replace of information, etc., as described in the present embodiment and designated by an instruction sequence of programs, and writes the result back to the memory such as the RAM 2020. For example, if performing condition judging, then the CPU 2000 may judge whether each type of variable shown in the present embodiment is larger, smaller, no smaller than, no greater than, or equal to the other variable or constant, and if the condition judging results in the affirmative (or in the negative), then the process branches to a different instruction sequence, or calls a sub routine.

In addition, the CPU 2000 may search for information in a file, a database, etc., in the recording medium. For example, if a plurality of entries, each having an attribute value of a first attribute is associated with an attribute value of a second attribute, are stored in a recording apparatus, then the CPU 2000 may search for an entry matching the condition whose attribute value of the first attribute is designated, from among the plurality of entries stored in the recording medium, and reads the attribute value of the second attribute stored in the entry, thereby obtaining the attribute value of the second attribute associated with the first attribute satisfying the predetermined condition.

The above-explained program or module may be stored in an external recording medium. Exemplary recording mediums include a DVD-ROM 2095, as well as an optical recording medium such as a Blu-ray Disk or a CD, a magneto-optic recording medium such as a MO, a tape medium, and a semiconductor memory such as an IC card. In addition, a recording medium such as a hard disk or a RAM provided in a server system connected to a dedicated communication network or the Internet can be used as a recording medium, thereby providing the program to the computer 1900 via the network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium, which may implement the storage section, may be, for example, but is not limited to, an electronic storage device, a magnetic storage device, an optical storage device, an electromagnetic storage device, a semiconductor storage device, or any suitable combination of the foregoing.

A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server.

In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s).

In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiment(s) of the present invention has (have) been described, the technical scope of the invention is not limited to the above described embodiment(s). It is apparent to persons skilled in the art that various alterations and improvements can be added to the above-described embodiment(s). It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

As made clear from the above, the embodiments of the present invention can be used to realize an apparatus, a method, and a computer program product for detecting anomaly sensors.

What is claimed is:

1. An apparatus comprising:
   a processor; and
   one or more computer readable mediums collectively including instructions that, when executed by the processor, cause the processor to:
   determine a healthy data distribution employing a plurality of healthy sensor data for a plurality of sensors in normal operation;
   generate a function of a status probability distribution of the plurality of sensors with respect to time under a condition of sensor data with respect to time based on the healthy data distribution; and
   determine whether each of the plurality of sensors are anomalous based on the status probability distribution of the plurality of sensors and prior distribution of the sensors, wherein a decay factor represents a value of a reduction of influence of the prior distribution of the sensors in the status probability distribution.

2. The apparatus of claim 1, wherein the function of the status probability distribution is based on the data distributions with respect to time under the condition of status of the plurality of sensors.

3. The apparatus of claim 2, wherein the instructions further cause the processor to:
   estimate the status probability distribution from new sensor data.

4. The apparatus of claim 3, wherein the function of the status probability distribution is based on a product of the data distributions with respect to time under a condition of status of the plurality of sensors.

5. The apparatus of claim 4, wherein the function of the status probability distribution is further based on Beta prior distributions, wherein each Beta prior distribution represents a prior distribution of each sensor.

6. The apparatus of claim 5, wherein the instructions further cause the processor to:
   approximate the function of the status probability distribution with a Bernoulli distribution with respect to time.

7. The apparatus of claim 6, wherein the approximation of the function of the status probability distribution includes updating parameters of the Beta prior distributions and the Bernoulli distribution with respect to time to reduce a difference caused by an approximation.

8. The apparatus of claim 3, wherein the function of the status probability distribution is based on the data distributions with respect to time under the condition of status of the plurality of sensors having newer data distributions weighted more than older data distributions.

9. The apparatus of claim 3, wherein the function of the status probability distribution is based on the data distributions with respect to a first period of time under a condition of status of the plurality of sensors.

10. The apparatus of claim 9, wherein the instructions further cause the processor to:
    estimate the function of the status probability distribution by approximating a parameter of a Bernoulli distribution for the new sensor data with respect to a second period of time and using a parameter of a Bernoulli distribution for previous data with respect to a third period of time, the third period of time being previous to the second period of time.

11. The apparatus of claim 10, wherein the instructions further cause the processor to estimate the status probability distribution from the new sensor data by using a coordinate descent method.

12. The apparatus of claim 3, wherein the instructions further cause the processor to:
    determine whether each of the plurality of sensors is healthy or anomalous from the new sensor data based on the status probability distribution of the new sensor data.

13. The apparatus of claim 1, wherein the instructions further cause the processor to generate the function of the status probability distribution further based on an anomalous data distribution, wherein the anomalous data distribution is approximated with a uniform distribution.

14. The apparatus of claim 1, wherein the instructions further cause the processor to generate the healthy data distribution of a pair of sensors among the plurality of sensors.

15. A computer-implemented method comprising:
    determining a healthy data distribution employing a plurality of healthy sensor data for a plurality of sensors in normal operation;
    generating a function of a status probability distribution of the plurality of sensors with respect to time under a condition of sensor data with respect to time based on the healthy data distribution; and
    determining whether each of the plurality of sensors are anomalous based on the status probability distribution of the plurality of sensors and prior distribution of the sensors, wherein a decay factor represents a value of a reduction of influence of the prior distribution of the sensors in the status probability distribution.

16. The computer-implemented method of claim 15, wherein the function of the status probability distribution is based on the data distributions with respect to time under a condition of status of the plurality of sensors.

17. The computer-implemented method of claim 16, further comprising:
    estimating the status probability distribution from new sensor data.

18. The computer-implemented method of claim 17, wherein the function of the status probability distribution is based on a product of the data distributions with respect to time under the condition of status of the plurality of sensors.

19. The computer-implemented method of claim 18, wherein the function of the status probability distribution is further based on Beta prior distributions, wherein each Beta prior distribution represents a prior distribution of each sensor.

20. The computer-implemented method of claim 19, further comprising:
approximating the function of the status probability distribution with a Bernoulli distribution with respect to time.

21. A computer program product comprising including one or more computer readable mediums collectively including instructions that, when executed by the processor, cause the processor to:
determine a healthy data distribution employing a plurality of healthy sensor data for a plurality of sensors in normal operation;
generate a function of a status probability distribution of the plurality of sensors with respect to time under a condition of sensor data with respect to time based on the healthy data distribution; and
determine whether each of the plurality of sensors are anomalous based on the status probability distribution of the plurality of sensors and prior distribution of the sensors, wherein a decay factor represents a value of a reduction of influence of the prior distribution of the sensors in the status probability distribution.

22. The computer program product of claim 21, wherein the function of the status probability distribution is based on the data distributions with respect to time under a condition of status of the plurality of sensors.

23. The computer program product of claim 22, wherein the instructions further cause the processor to estimate the status probability distribution from new sensor data.

24. An apparatus comprising:
a processor; and
one or more computer readable mediums collectively including instructions that, when executed by the processor, cause the processor to:
generate a function of a status probability distribution of a plurality of sensors with respect to time under a condition of sensor data from a sensor among the plurality of sensors with respect to time based on a healthy data distribution;
wherein the healthy data distribution is determined for the plurality of sensors in normal operation based on a plurality of healthy sensor data; and
determine whether each of the plurality of sensors are anomalous based on the status probability distribution of the plurality of sensors and prior distribution of the sensors, wherein a decay factor represents a value of a reduction of influence of the prior distribution of the sensors in the status probability distribution.

25. A computer program product comprising including one or more computer readable mediums collectively including instructions that, when executed by the processor, cause the processor to:
generate a function of a status probability distribution of a plurality of sensors with respect to time under a condition of sensor data from a sensor among the plurality of sensors with respect to time based on a healthy data distribution;
wherein the healthy data distribution is determined for the plurality of sensors in normal operation based on a plurality of healthy sensor data; and
determine whether each of the plurality of sensors are anomalous based on the status probability distribution of the plurality of sensors and prior distribution of the sensors, wherein a decay factor represents a value of a reduction of influence of the prior distribution of the sensors in the status probability distribution.

* * * * *